United States Patent Office 3,313,776
Patented Apr. 11, 1967

3,313,776
PROCESS FOR INCREASING THE MOLECULAR WEIGHT OF A POLYPHENYLENE ETHER
Willem F. H. Borman, Dalton, Mass., assignor to General Electric Company, a corporation of New York
No Drawing. Filed Mar. 13, 1964, Ser. No. 351,820
5 Claims. (Cl. 260—47)

The present invention relates to a process of polymerization. More particularly it relates to a method for improving the efficiency of an oxidative polymerization reaction.

Catalytically activated oxidation reactions proceed under the activating influence of a catalytic agent distributed in the reaction mixture.

Catalytic oxidation reactions including oxidative polymerization of a number of phenolic base materials have been disclosed in co-pending applications of Hay, S.N. 212,127 and 212,128, filed July 24, 1962. It is economically desirable, of course, to improve the efficiency of these catalysed processes particularly with regard to the concentration of the catalyst which must be used in inducing the conversions.

An object of the present invention is to provide a method for increasing the efficiency of a polymerization process which depends on polycondensation accompanied by oxidation.

Another object is to increase the degree of control over such a polymerization process to produce polymer of desired molecular weight.

A further object is to increase the level of molecular weight of polymer which can be produced from a monomer of a given purity without increasing the amount of catalyst required.

Still another object is to accelerate the formation of polymer of desired molecular weight.

A still further object is to provide a method for adjusting the molecular weight of a batch of polymer to a desired level where the polymerization would otherwise have been below a desired value.

The manner in which these and a number of other objects and advantages of the present invention may be obtained will be clear from the following description which includes a number of examples of the practice of the present invention to illustrate the novel combination of steps employed and the novel results obtained.

The process for forming polyphenylene ethers is disclosed in the above noted co-pending U.S. patent applications of Allan S. Hay. In general, this process comprises the oxidative coupling of a monovalent phenol using as the oxygen-carrying intermediate, a solution of an amine-basic cupric salt complex catalyst in which the phenol is soluble.

In providing the catalyst, the particular copper salt used has no effect on the type of product obtained. I may start with either a cuprous or a cupric salt. The only requirement is that, if a cuprous salt is used, it must be capable of existing in the cupric state and must form a complex that is soluble in the reaction medium.

Typical examples of a copper salt suitable for forming the complex are cuprous chloride, cupric chloride, cuprous bromide, cupric bromide, cuprous sulfate, cupric sulfate, cuprous azide, cupric azide, cuprous tetraamine sulfate, cupric tetraamine sulfate, cuprous acetate, cupric acetate, cuprous propionate, cupric butyrate, cuprous palmitate, cupric laurate, cuprous benzoate, cupric toluate, etc., produce the most active catalysts. Although cupric sulfite is not known, cuprous sulfite can be used because it evidently is oxidized to cuprous sulfate. Copper salts such as cuprous iodide, cuprous sulfide, cupric sulfide, cuprous cyanide, cuprous thiocyanate, etc., are not suitable, since they either do not form soluble complexes with the nitrile, amides or amines, or are not capable of existing as stable cupric salts, for example, cupric cyanide and cupric thiocyanate autogeneously decompose to a corresponding cuprous salt. Cuprous nitrate and cuprous chloride are not known to exist but the nitrile, amide or amine complexes can be made in situ. Substitution of cupric chloride, cupric sulfate, cupric perchlorate, and cupric nitrate for the cuprous salt without first converting them to the corresponding basic cupric salt, did not catalyze the oxidation of the 2,6-disubstituted phenols to polyphenylene ethers.

The amine useful for forming the complex catalyst with the copper salt may be a primary, secondary or tertiary amine free of aryl substituents directly bonded to the amine nitrogen. Typical examples of suitable amines are the aliphatic amines, including cycloaliphatic amines wherein the cyclo aliphatic group is substituted on the amine nitrogen, for example, mono-, di- and trimethylamine, mono-, di- and triethylamine, mono-, di and tripropylamine, mono-, di- and tributylamine, mono, di- and trisecondary propylamine, mono-, di- and tribenzylamine, mono-, di- and tricyclohexylamine, mono-, di- and triethanolamine,
ethylmethylamine,
methylpropylamine,
allylethylamine,
methylcyclohexylamine,
morpholine,
methyl-n-butylamine,
ethylisopropylamine,
benzylmethylamine,
octylbenzylamine,
octylchlorobenzylamine,
methylcyclohexylamine,
methylphenethylamine,
benzylethylamine,
di(chlorophenethyl)amine,
1-methylamino-2-phenylpropane,
1-methylamino-4-pentene,
N-methyldiethylamine,
N-propyldimethylamine,
N-allyldiethylamine,
3-chloro-N,N'-dimethylpropylamine,
N-butyldimethylamine,
N-isopropyldiethylamine,
N-benzyldimethylamine,
N-benzyldioctylamine,
N-chlorobenzyldioctylamine,
N-cyclohexyldimethylamine,
N-phenethyldimethylamine,
N-benzyl-N-methylethylamine,
N-bromobenzyl di(chlorophenethyl)amine,
N,N-dimethyl-2-phenylpropylamine,
N-dimethyl-4-pentenyl amine,
N,N-diethyl-2-methylbutyl amine, etc.

When aliphatic amines are used, I prefer that the aliphatic groups be straight chain hydrocarbon groups.

Examples of cyclic amines are the pyridines, such as pyridine itself, $\alpha$-, $\beta$- and $\gamma$-collidine, $\alpha$-, $\beta$- and $\gamma$-picoline, and 2,4-, 2,5-, 2,6- and 3,4-lutidine, quinuclidine, the dipyridyls, the pyrroles, the pyrrolidines, the piperidines, the diazoles, the triazoles, the diazines, the triazines, the quinolines, the diquinoyls, the isoquinolines, the tetrahydroquinolines, the tetrahydroisoquinolines, the phenanthrolines, the morpholines, etc., including the ring-substituted products of these cyclic amines whereby one or more of the hydrogen atoms on the carbons forming the ring are substituted by groups which may be aliphatic (for example, methyl, ethyl, vinyl, propyl, propenyl, butyl, amyl, hexyl, heptyl, octyl, etc., and isomers and the homologues thereof), alkoxy (for example, methoxy, ethoxy, vinoxy, propoxy, propenoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that secondary cyclic amines, e.g., piperidines, pyrroles, pyrrolidines, tetrahydroquinolines, tetrahydroisoquinolines may also be used in the form of tertiary amines whereby an alkyl hydrocarbon radical, such as those listed above for the ring substituents, is attached to the amine nitrogen group, e.g., N-methylpyrrole,
N-methyl tetrahydroquinoline,
N-methyl tetrahydroisoquinoline,
N-methyl piperidine,
N-methyl pyrrolidine,
N-methylimidazole,
N-methyl-1,2,4-triazole,
N-decylpiperidine,
N-decylpyrrolidine,
N-isobutylpiperidine,
1-decyl-2-methylpiperidine,
N-isopropylpyrrolidine,
N-cyclohexylpiperidine, etc.

In general, primary, secondary, tertiary, mixed primary-secondary, mixed primary-tertiary or mixed secondary-tertiary polyamines would behave in the same way as primary, secondary and tertiary monoamines in my reaction, except of course, the amount used would only have to be that amount necessary to give the equivalent amount of amino groups. I may use polyamines wherein two or more amine groups, of the kind listed above for the monoamines, are attached to an aliphatic or cycloaliphatic nucleus, e.g., ethylene, diethyleneamine, propylene, butylene, pentylene, hexylene, cyclopentylene, cyclohexylene, etc. Typical examples of these aliphatic polyamines are the N,N-dialkylethylenediamines,
N,N,N'-trialkylethylenediamine,
propanediamine,
ethylenediamine,
the N-alkylethylenediamines,
the N-alkylpropanediamines,
the N,N'-dialkylpropanediamines,
the N,N,N'-trialkylpropanediamines,
propanediamine,
the N-alkylpropanediamines,
the N,N'-dialkylbutanediamines,
pentanediamine,
the N-alkylpentanediamines,
the N,N'-dialkylpentanediamines,
the N,N,N'-trialkylpentanedianes,
diethylenetriamine,
the N-alkyldiethylenetriamines,
the N'-alkyldiethylenetriamines,
the N,N',N''-trialkyldiethylenetriamines,
the N,N',N'-trialkyldiethylenetriamines,
the N,N',N-trialkyldiethylenetriamines,
the N,N',N',N''-tetraalkyldiethylenetriamines,
the N',N',N'',N''-tetraalkyldiethylenetriamines,
the cyclohexylenediamines, etc.

Likewise, the polyamines may be mixed aliphatic and cyclic amines, e.g., aminoalkylpyridines, alkylpyridines, etc. I have, however, discovered that those polyamines which have only two or three aliphatic or cycloaliphatic carbon atoms separating the two primary or secondary amino nitrogens represent a class of polyamines which are strong chelating agents and form complexes with the copper salt which so completely envelope the copper that the complex is less reactive than the other aliphatic primary or secondary amines in the oxidation reaction. Because of this, I prefer, when using primary or secondary amines, to use primary and secondary monoamines. However, this is not true of tertiary polyamines. Typical examples of such tertiary amines are:

N,N,N',N'-tetramethylethylenediamine;
N,N,N',N'-tetraethylethylenediamine;
N,N,N',N'-tetrapropylethylenediamine;
N,N,N',N'-tetrabutylethylenediamine,
N-butyl-N-octyl-N',N'-dimethylethylenediamine-
    $N^1,N^1$-dibenzyl-$N^2,N^2$-dimethyl-1,2-propanediamine,
$N^2$-dimethyl-1,2-propanediamine,
2-chloro-N,N,N',N'-tetraethyl-1,3-propanediamine,
N'-(3-chloro-p-tolyl)-N,N-diethyl-N'-methyl-1,3,2-
    ($\beta$-dimethylaminoethyl)pyridine,
N,N,N',N'-tetrabenzyl-3-butene-1,2-diamine,
N,N,N',N'-tetramethyl-2-butyne-1,4-diamine,
N,N,N',N'-tetraallylputrescine,
N,N,N',N'-tetramethyl-1,4-diphenylputrescine,
N,N,N',N'-tetraisopropyl-1,3-butanediamine,
N,N,N',N'-tetramethyl-1,3-cyclopentanediamine,
N,N,N',N'-tetramethyl-1,4-cyclohexanediamine, etc.,
N-ethyl-N,N'-N'-trimethylethylenediamine;
N-methyl-N,N',N'-triethylethylenediamine;
N,N,N',N'-tetramethyl-1,3-propanediamine;
N,N-dimethyl-N',N'-diethylethylenediamine;
1,2-bis(2-methylpiperidino)ethane;
N,N,N',N'-tetra-n-hexylethylenediamine;
N,N,N',N'-tetra-n-amylethylenediamine;
1,2-bispiperidinoethane,
N,N,N',N'-tetraisobutylethylenediamine;
N,N,N',N'-tetramethyl-1,3-butanediamine;
N,N,N',N'-tetramethyl-1,2-cyclohexanediamine;
1,2-bis(2,6-dimethylpiperidino)ethane;
N,N-didecyl-N',N'-dimethylethylenediamine;
N-methyl-N',N',N'',N''-tetraethyldiethylenetriamine;
N-decyl-N,N',N'-triethylethylenediamine;
2-($\beta$-piperidinoethyl)-pyridine;
2-($\beta$-dimethylaminoethyl)-6-methylpyridine;
2-($\beta$-dimethylaminoethyl)pyridine;
2-($\beta$-morpholinoethyl)-pyridine; etc.

The process, in acordance with the present invention, comprises the step of extending the degree of polymerization of the polyphenylene ethers during the course of the polymerization reaction by making additions of a strong oxidizing agent to the reaction mixture at those points in the reaction when the rate of polymerization decreases and the degree of polymerization tends to become constant.

The monovalent phenols, which can be polymerized by the Hay process, may be represented by the formula

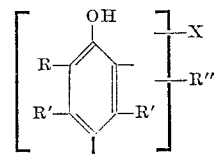

where X is a substituent selected from the group consisting of hydrogen, chlorine, bromine and iodine, R is a monovalent substituent selected from the group consisting of hydrogen, hydrocarbon radicals, hydrocarbonoxy radicals, halohydrocarbon radicals having at least two carbon atoms between the halogen atom and phenol nucleus, and halohydrocarbonoxy radicals having at least two carbon atoms between the halogen atom and the phenol nucleus; R' and R'' are the same as R and, in addition, halogen, i.e., fluorine, chlorine, bromine, iodine.

Typical phenols include: phenol itself (hydroxybenzene), 2-chlorophenol,
4-bromophenol,
2,4-dichlorophenol,
2-chloro-4-bromophenol,
2,3,5-trichlorophenol,
3-phenylphenol,
2-chloro-3-methylphenol,
3,5-dimethylphenol,
2,4-dichloro-3,5-dimethylphenol,
3-methyl-5-ethylphenol,
3-octadecylphenol,
3-iodophenylphenol,
3-tolylphenol,
3-methoxyphenol,
3-decoxyphenol,
3-methoxy-5-ethoxyphenol,
2-bromo-3-phenoxy-5-benzyloxyphenol,
2-methylphenol,
2-cyclohexylphenol,
the 2-(chlorocyclohexyl)-phenols,
2-methyl-6-bromophenol,
2-methyl-4-chloro-6-bromophenol,
2-(chloroethyl) phenol,
2,3,5-trimethylphenol,
2,3,5-trimethyl-6-chlorophenol,
2-butyl-3,5-diphenylphenol,
2-chlorophenol,
2-ethoxyphenol,
2-phenoxyphenol,
4-phenylphenol,
2-chloro-4-methylphenol,
3,4,5-trimethylphenol,
3-butyl-4-methylphenol,
4-methoxyphenol,
2,4-diethylphenol,
2,4-dioctylphenols,
2,4-dimethyl-3-chlorophenol,
2,4-dimethyl-5-bromophenol,
2-methyl-4-allylphenol,
2-methyl-4-methoxyphenol,
2,4-dimethoxyphenol,
2,6-dimethylphenol,
2,6-diethylphenol,
the 2,6-dibutylphenols,
2,6-dilaurylphenol,
the 2,6-dimethylphenols,
2,6-diphenylphenol,
2,6-dimethoxyphenol,
2,3,6-dimethylphenol,
2,3,5,6-tetramethylphenol,
2,6-diethoxyphenol,
2-methoxy-6-ethoxyphenol,
2-ethyl-4-stearyloxyphenol,
the 2,6-di-(chlorophenoxy)phenols,
2,6-dimethyl-3-chlorophenol,
2,3-dimethyl-4-chlorophenol,
2,6-dimethyl 3-chloro-5-bromophenol,
2,6-di(chloroethyl) phenol,
2-methyl-6-isobutyl phenol,
2-methyl-6-phenylphenol,
2,6-dibenzylphenol,
2,6-ditolylphenol,
2,6-di(chloropropyl) phenol,
2,6-di-(2',4',-dichlorophenyl)-3-allylphenol, etc.

The manner in which the process may be carried out will be made clearer from the following examples, although it will be understood that these examples are given primarily to illustrate and not to limit or define the scope of the invention.

*Example 1*

A glass reactor vessel was provided with a stirrer, a gas inlet, a reflux condenser, thermometer and water jacket. To this reactor were charged the following ingredients:

| | | |
|---|---|---|
| Cuprous bromide | grams | 1.0 |
| Diethylamine | do | 3.65 |
| 2,6-dimethylphenol (98.1% pure) | do | 50 |
| Anhydrous MgSO$_4$ | do | 25 |
| Toluene | milliliters | 500 |

Stirring of the mixture was started and oxygen gas was passed into the reactor and through the mixture at a rate of 440 milliliters per minute. Immediately the temperature started to rise rapidly and went up to 50.5° C. for the first seven minutes. Cooling of the mixture was then started by pumping water at a temperature of 35° C. through the water jacket around the reactor. Twenty-five minutes after the beginning of the reaction the temperature of the contents of the reactor had come down to 35° C.

A sample of the mixture was withdrawn for determination of molecular weight of the polymer product formed. For this purpose a 10 milliliter sample of the reaction mixture was withdrawn and centrifuged. The supernatant liquid was added to an excess of methanol containing 5% concentrated hydrochloric acid. The precipitate which formed was washed with methanol and dried. A weighted amount of the sample of polymer separated in this way from the reaction mixture was later dissolved in chloroform to permit determination of its intrinsic viscosity.

The contents of the reactor were sampled at intervals in this manner as the reaction proceeded therein, and the polymer product present was separated from each of the samples as described above to permit the detection of changes in molecular weight of the polymer during the course of its formation in the reactor. The time of sampling was recorded and the relative solution viscosity and polymer intrinsic viscosity values were determined for the samples.

After the polymerization had proceeded for 100 minutes, the relative solution viscosity had become virtually constant at a value of 2.7 and the polymer present in the reaction mixture had an intrinsic viscosity in chloroform at 30° C. of 0.36 dl./g. At this time 1 ml. of a 30% aqueous solution of hydrogen peroxide (H$_2$O$_2$) was added. Ten minutes later the relative solution viscosity had increased from 2.7 to 3.0 and the polymer intrinsic viscosity from 0.36 dl./g. to 0.39 dl./g. Twenty-five minutes after the addition of H$_2$O$_2$ (total time from the start 125 minutes) the relative solution viscosity was 3.2. At this time, again 1 ml. H$_2$O$_2$ was added, causing the relative solution viscosity (RSV) to increase to 3.6 in 15 minutes. At this time (140 minutes from the start of the polymerization), 2.0 ml. H$_2$O$_2$ was added and the RSV increased 4.0 in the next 16 minutes. No further addition of H$_2$O$_2$ were made and during the next 15 minutes the RSV only increased from 4.0 to 4.1. At this time (171 minutes from start) the polymer had an intrinsic viscosity of .41 dl./g.

This sequence of treatments may be shown in tabular form as follows:

TABLE 1.—RESULTS OF THE POLYMERIZATION OF EXAMPLE 1

| Elapsed Time (minutes) | Ml. of H$_2$O$_2$ Added | Relative Solution Viscosity | Polymer Intrinsic Viscosity (dl./g.) |
|---|---|---|---|
| 25 | | 1.8 | .29 |
| 40 | | 2.1 | .32 |
| 55 | | 2.4 | .34 |
| 100 | 1.0 | 2.7 | .36 |
| 110 | | 3.0 | .39 |
| 125 | 1.0 | 3.2 | |
| 140 | 2.0 | 3.6 | |
| 156 | | 4.0 | |
| 171 | | 4.1 | .41 |

At this point the reaction mixture was filtered and 10 milliliters of concentrated HCl and 800 milliliters of methanol were added to the filtrate to precipitate the polymer product formed. The precipitated polymer was separated by filtration, washed with methanol and dried.

From the results achieved by this treatment, it is evident that the additions of hydrogen peroxide were effective in increasing the relative solution viscosities and polymer intrinsic viscosities of the polymer product formed.

The sharp increase of relative solution viscosity as compared to intrinsic viscosity indicates that either the molecular weight distribution broadens, or branching is introduced in the originally linear polymer or that a combination of these changes is brought about by the treatment employed in this example.

Example 2

The reaction procedure described in Example 1 was repeated with two modifications.

By the first modification 3.0 milliliters of 30% $H_2O_2$ was added at the beginning of the reaction. No effect on the course of the reaction was observed from this addition at the outset.

The second modification was the addition of small quantities of $H_2O_2$ at 15 minute intervals starting approximately 283 minutes after the polymerization reaction had commenced and when the reaction was apparently essentially complete.

80 minutes from the start of the reaction, the RSV was 2.2 and the polymer intrinsic viscosity in $CHCl_3$ at 30° C. was 0.33 dl./g. These values are actually slightly lower than would have been expected from the results listed in Table 1, indicating that addition of $H_2O_2$ at the start of the reaction has no beneficial effect.

80 minutes after the start of the reaction 0.2 ml. 30% $H_2O_2$ was added and 131 minutes after the start of the reaction 1 ml. 30% $H_2O_2$ was added. Each addition caused the polymer molecular weight to increase more rapidly than had been observed immediately before the addition of $H_2O_2$ took place.

After 283 minutes, no further increase in RSV was observed. At this time the RSV was 3.5 and the polymer intrinsic viscosity 0.40 dl./g.

1.0 ml. 30% $H_2O_2$ was now added to the reaction mixture followed by four 0.5 ml. 30% $H_2O_2$ increments at 15 minute intervals. 15 minutes after the last increment had been added (360 min. from the start of the reaction), the RSV had increased to 5.4 and the polymer intrinsic viscosity to 0.50 dl./g.

It is evident that frequent or continuous additions of small amounts of 30% $H_2O_2$ after the polymerization has virtually stopped, is an effective method of further increasing the molecular weight of the polymer being formed.

TABLE II.—RESULTS OF POLYMERIZATION OF EXAMPLE 2

| Elapsed Time (minutes) | Ml. of 30% $H_2O_2$ Added | Relative Solution Viscosity | Intrinsic Viscosity (dl./g.) |
| --- | --- | --- | --- |
| 0 | 3.0 | | |
| 36 | | 1.8 | .29 |
| 80 | 0.2 | 2.2 | .33 |
| 90 | | 2.4 | .34 |
| 131 | 1.0 | 2.6 | .36 |
| 139 | | 2.9 | |
| 283 | 1.0 | 3.5 | |
| 300 | 0.5 | 3.9 | .40 |
| 315 | 0.5 | | |
| 330 | 0.5 | | |
| 345 | 0.5 | | |
| 360 | | 5.4 | .50 |

Further, it is observed that the relative solution viscosity, increases more rapidly than the intrinsic viscosity of the polymer as a result of the additions of the $H_2O_2$.

Example 3

The reaction procedure in Example 1 was repeated with the modification that periodically a saturated solution of $K_3Fe(CN)_6$ was added and that a less pure monomer (97.5% pure) was employed.

After 120 minutes no further increase in RSV or polymer intrinsic viscosity was noted. At this time the RSV was 3.4 and the intrinsic viscosity of a polymer sample was 0.40 dl./g. Addition of one ml. of distilled water at this time did not have any effect, as the RSV 19 minutes later was still 3.4.

At this time (139 min. from the start) and also at 162, 180 and 210 minutes from the start of the reaction, 1 ml. of a saturated solution of $K_3Fe(CN)_6$ in distilled water was added to the reaction mixture. A steady rise in RSV and polymer intrinsic viscosity was noted until 240 minutes from the start of the reaction the RSV was 4.4 and the polymer intrinsic viscosity was 0.47 dl./g.

TABLE III.—RESULTS OF THE POLYMERIZATION OF EXAMPLE III

| Elapsed Time (minutes) | Ml. of Oxidizing Agent Added | Relative Solution Viscosity | Intrinsic Viscosity (dl./g.) |
| --- | --- | --- | --- |
| 0 | | 3.4 | .40 |
| 120 | 1 ml. $H_2O$ | 3.4 | |
| 139 | 1 ml. $K_3Fe(CN)_6$ | 3.7 | .43 |
| 162 | 1 ml. $K_3Fe(CN)_6$ | 4.0 | |
| 180 | 1 ml. $K_3Fe(CN)_6$ | | |
| 210 | 1 ml. $K_3Fe(CN)_6$ | | |
| 240 | Stopped Reaction | 4.4 | .47 |

It has been observed during catalytic auto condensation polymerizations that the reactions proceed rapidly at first and then level off and eventually terminates with the production of a certain terminal polymer molecular weight. The terminal molecular weight level attained normally depends in general on a number of factors. In the case of the polymerization of the 2,6-xylenol with cuprous salts and complexing amines as described in the Hay applications referred to above, the factors which determine the molecular weight of the polymer product include the purity of the monomer, the nature of the complexing amine, the catalyst concentration, the solvent, and a number of other similar factors. With any specific copper-amine catalyst system, higher molecular weight polymers are generally obtained by increasing the catalyst concentration.

The value of the present invention can be seen from the results given in the above examples. Where the factors which normally control molecular weight were kept essentially constant the reaction was essentially terminated at a constant molecular weight in the normal time interval. However, a higher molecular weight product was obtained by the metered additions of a strong oxidizing agent such as hydrogen peroxide. It is accordingly possible through the use of such additions of peroxide to establish an additional and advantageous element of control over the nature and property of the polymer product which is formed.

As another illustration of such advantageous control made possible by the present invention, it has been observed that polymers prepared with catalyst systems containing tertiary amines usually have a higher molecular weight than polymers prepared with catalyst systems containing secondary amines, provided all other variables are kept constant. However, it has also been observed that the higher molecular weight products resulting from use of the catalysts containing tertiary amines have inferior heat stability properties as evidenced by color change of the material and cross-linking during extrusion and molding. The lower molecular weight products formed through use of the secondary amine catalysts do not have the inferior heat stability but also do not have the high molecular weight. Therefore, it is often preferred to use secondary amines in the catalyst system, even though this necessitates higher catalyst concentrations in order to obtain the minimum polymer molecular weight at which the thermoplastic product has acceptable strength and elasticity properties. By use of the reaction promoting additions made possible by the present invention, the minimum required molecular weight is achievable without increasing the catalyst concentration even where the catalysts which include the secondary amines are included in the catalytic agent employed in the polymerization.

Alternatively, the addition of small amounts of hydrogen peroxide, $K_3Fe(CN)_6$ or other oxidizing agents to the reaction mixture in accordance with this invention can be employed to prevent the slowing down or leveling off of the degree of polymerization which normally occurs in its absence. Such slowing down can be prevented at least until a much higher molecular weight polymer has been formed by the polymerization reaction in progress at the time of addition.

As a further alternative use, additions of hydrogen peroxide, $K_3Fe(CN)_6$ or other oxidizing agents can be made in accordance with the present invention even after the increase of the molecular weight of the product being formed has levelled off. Each such addition of a small amount of the hydrogen peroxide has the effect of essentially reactivating the polymerization reaction.

The addition of hydrogen peroxide or other oxidizing agents has a beneficial effect on the polymerization only for a relatively short interval. Where agents present in the reaction mixture lead to a decomposition of the peroxide even where the catalyst itself acts as such an agent, less effective use is made of the peroxide and materials included in a composition to be subjected to the treatment of this invention should be chosen to minimize or avoid this destruction. Where such decomposition occurs, an addition of peroxide early in the reaction period has little or no effect on the properties of the polymer formed. Similarly, if the peroxide is added during the polymerization, or principally toward the end of the polymerization, it is preferred to add it in small increments or as a continuous slow stream to overcome or offset the effects of peroxide decomposition. Relatively large increases in molecular weight of product can be obtained by these small incremental metered additions of the hydrogen peroxide to the reaction mixture.

Although the invention has been described with specific reference to hydrogen peroxide and $K_3Fe(CN)_6$, it is apparent that other oxidizing agents, such as peroxides, organic and inorganic, will produce similar results where they are compatible with the composition undergoing catalytic self-condensation. Strong oxidizing agents such as $KMnO_4$, $CrO_3$, $FeCl_3$, and similar oxidizing agents will produce the activating effects on compositions undergoing oxidative polymerization where compatibility exists with the medium and the materials of the reaction mixture. In addition, ozone is an active oxygen source and will produce activating effects over the use of oxygen gas, per se.

Since many modifications can be made in the materials and steps employed in carrying out the invention as described above, it will be understood that the foregoing description and examples are given primarily to illustrate and define the invention and that the description should not be interpreted as limiting the invention except as may be necessary by the claims which follow.

What is claimed is as follows:

1. In a process for forming a polyphenylene ether by oxidatively coupling a monovalent phenol in the presence of oxygen and an oxygen carrying copper amine catalyst solution formed from a copper salt and an amine selected from the group consisting of primary, secondary and tertiary amines free of aryl substituents directly bonded to the amine nitrogen, the improvement which consists of extending the degree of polymerization of the polyphenylene ether by making additions of a strong oxidizing agent to the reaction mixture at those points in the polymerization reaction when the rate of polymerization decreases and the degree of polymerization tends to become constant.

2. The method of claim 1 in which the strong oxidizing agent is hydrogen peroxide.

3. The method of claim 1, in which the strong oxidizing agent is potassium ferricyanide $K_3Fe(CN)_6$.

4. The method of claim 1 in which the auto-condensation reaction is the oxidative polymerization of 2,6-dimethylphenol and in which the strong oxidizing agent is hydrogen peroxide.

5. The method of claim 3 in which the strong oxidizing agent is a saturated aqueous solution of potassium-ferricyanide.

References Cited by the Examiner

UNITED STATES PATENTS 3,236,807   2/1966   Stamatoff _____ 260—47

OTHER REFERENCES

Staffin, J. Am. Chem. Soc., vol. 82, pp. 3632–3634, July 20, 1960.

WILLIAM H. SHORT, *Primary Examiner.*

M. GOLDSTEIN, J. C. MARTIN, *Assistant Examiners.*